US008352711B2

(12) United States Patent (10) Patent No.: US 8,352,711 B2
Tribble et al. (45) Date of Patent: Jan. 8, 2013

(54) COORDINATING CHORES IN A MULTIPROCESSING ENVIRONMENT USING A COMPILER GENERATED EXCEPTION TABLE

(75) Inventors: Eric Dean Tribble, Bellevue, WA (US); Mark Ronald Plesko, Kirkland, WA (US); Christopher Wellington Brumme, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 1388 days.

(21) Appl. No.: 12/018,060

(22) Filed: Jan. 22, 2008

(65) Prior Publication Data

US 2009/0187893 A1 Jul. 23, 2009

(51) Int. Cl.
*G06F 15/00* (2006.01)
*G06F 7/38* (2006.01)
*G06F 9/00* (2006.01)
*G06F 9/44* (2006.01)

(52) U.S. Cl. ..................................................... 712/220
(58) Field of Classification Search ........................ None
See application file for complete search history.

(56) References Cited

U.S. PATENT DOCUMENTS

| | | | | |
|---|---|---|---|---|
| 5,452,461 A * | 9/1995 | Umekita et al. | ............... | 717/149 |
| 6,560,619 B1 * | 5/2003 | Flood et al. | ................... | 707/613 |
| 6,675,191 B1 | 1/2004 | Ito | | |
| 6,711,616 B1 | 3/2004 | Stamm et al. | | |
| 7,016,923 B2 | 3/2006 | Garthwaite et al. | | |
| 7,137,116 B2 | 11/2006 | Parkes et al. | | |
| 7,165,256 B2 | 1/2007 | Boudnik et al. | | |
| 2006/0095909 A1 | 5/2006 | Norton | | |
| 2006/0123423 A1 | 6/2006 | Brenner | | |

OTHER PUBLICATIONS

Frigo et al., The Implementation of the Cilk-5 Multithreaded Language, May 1998, pp. 212-223.*
Goldstein et al., Lazy Threads: Implementing a Fast Parallel Call, 1996, pp. 5-20.*
Leiserson, Charles et al., "The Cilk Project", 2 pages, accessed at http//supertech.csail.mit.edu/cillk/, website last updated Oct. 23, 2007.
Korch, M et al., "Evaluation of Task Pools for the Implementation of Parallel Irregular Algorithms", Parallel Processing Workshops, 2002, pp. 597-604, available at: http://ieeexplore.ieee.org/Xplore/login.jsp?url=/iel5/8062/22290/01039782.pdf.
Korch, Matthias et al., "A Comparison of Task Pools for Dynamic Load Balancing of Irregular Algorithms", Feb. 26, 2002, 32 pages, Martin-Luther-Universitat Halle-Wittenber, Germany, available at: http://aspen.ucs.indiana.edu/CCPEwebresource/c595korch/c595tplong.pdf.
Weissman, Boris et al., "A Performance Evaluation of Fine-Grain Thread Migration with Active Threads", Dec. 16, 1997, 23 pages, International Computer Science Institute, Berkeley, CA, available at: http://www.icsi.berkeley.edu/~sather/Publications/tr-97-054.ps.gz.

* cited by examiner

*Primary Examiner* — Eddie P Chan
*Assistant Examiner* — George Giroux
(74) *Attorney, Agent, or Firm* — Workman Nydegger

(57) ABSTRACT

The coordination and execution of chores in a multiprocessing environment. The coordination of chores is accomplished utilizing a compiler generated correlation that relates blocks of code that execute chores and blocks of code in which the chore can be realized. By tracking the execution of the program and using the compiler-generated correlation, chores can be identified for the currently executing code.

19 Claims, 5 Drawing Sheets

COORDINATING CHORES IN A MULTIPROCESSING ENVIRONMENT USING A COMPILER GENERATED EXCEPTION TABLE

CROSS-REFERENCE TO RELATED APPLICATIONS

Not Applicable

BACKGROUND

Computers typically operate by having a processor execute a program. The program is represented using a sequence of instructions that may be executed by the processor. In order to improve processing speed, multi-processor computing systems are in operation. Such multi-processor systems may have as few as two processors, but could also have numerous processors.

By adding a second processor to a computing system, the system is theoretically twice as powerful and can perform double the computations. In a perfect world, the actual performance of a computing system would scale linearly with the number of processors. Unfortunately, this is typically not the case as there are other bottlenecks within the system that limit the performance increase with each additional processor.

One such bottleneck is in the program itself. In order for a program to take advantage of multiple processors, it should be able to execute multiple processes in parallel. If a program is not written in such a way to take advantage of multiple processors, it will generally only execute on a single processor resulting in any additional processors simply idling rather than performing actual work.

If a programmer knows the number of processors available to execute the program, the programmer can write the program in such a way to take advantage of the known processors. One example of such a system would be to assign each window to a processor. In this way, each window would remain responsive with a dedicated processor.

While such a system would be workable with a small number of processors, it quickly becomes unwieldy as the number of processors increases. Furthermore, if the program is written anticipating a certain number of processors, it may be unable to take advantage of a computing system having more processors than originally contemplated leaving the additional processors idle. Worse yet, the program may not run at all on a computing system with an unanticipated number of processors.

Some solutions do not require a programmer to explicitly program parallel execution and manage the coordination of execution. One such solution uses the concept of chores. A chore is generally defined as an opportunity for parallelism. Using the concept of chores, a programmer can, at the time of programming, identify portions of code that can be executed in parallel if possible, without worrying about the actual details of load balancing, paging, and communication between processors. Instead, a runtime system determines which chores to run in parallel depending on available processors and resources.

Often, there are many more opportunities for parallelism than actual processors to execute the chores. Is some cases, there may be several orders of magnitude more opportunities for parallelism at any given time that there are processor available to take advantage of those opportunities. In conventional solutions, there are significant resources used to create each chore in which a block of code is assigned to a particular processor. Furthermore, there are resources required during a "steal" operation in which an available processor takes a chore from another processor. In the environment in which there are many more chores than there are processors, the chore creation operation may be frequent, whereas the chore steal operation may be infrequent. As a result, the overhead associated with creating and executing chores limits the performance of and scalability of a chore-based system.

BRIEF SUMMARY

The concepts described in this application are generally directed to embodiments for managing the execution of chores in a multiprocessing environment.

The process of developing an application that takes advantages of a chore-based system begins when the executable code is developed. Initially a programmer identifies opportunities for parallelism within the code of the application. Alternately, the opportunities for parallelism can be identified using an automated system at the time the application code is compiled or interpreted into executable code.

The compiler or interpreter is then used to transform the application code into executable code for execution in a computing system. As part of the generation of executable code, the compiler generates a data structure that relates specific locations of the executable code. Currently compilers generate such data structures in the form of an exception table, but other types of data structures could be generated.

When the computer application is executed, a processor executes the instructions of the executable code. At some point, if there are enough processors in the computer system, a processor may run out of work to do. When a processor runs out of work, it searches for other work to do. The processor finds additional work by identifying the location of an instruction pointer and looking up the location in the data structure.

If the location of the pointer is determined to be in a particular block of code, the processor can then proceed to steal work from a different processor by executing chore related code identified by the data structure. Before the processor can actually steal the work, it must first verify that the chore has not already been stolen or is in the process of being stolen. If the chore is available to steal, the processor marks the chore as being stolen and executes it. If the chore is not available to steal, the processor continues to look for other work to do.

When a processor executing code attempts to execute a portion of code identified as being associated with a chore, the processor first verifies that another processor has not stolen or is not currently stealing the chore. The processor performs the verification and if there is no indication the chore has been or is being stolen, the processor executes the chore. If the chore is indicated as being stolen or in the process of being stolen, then the processor will typically skip the chore.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
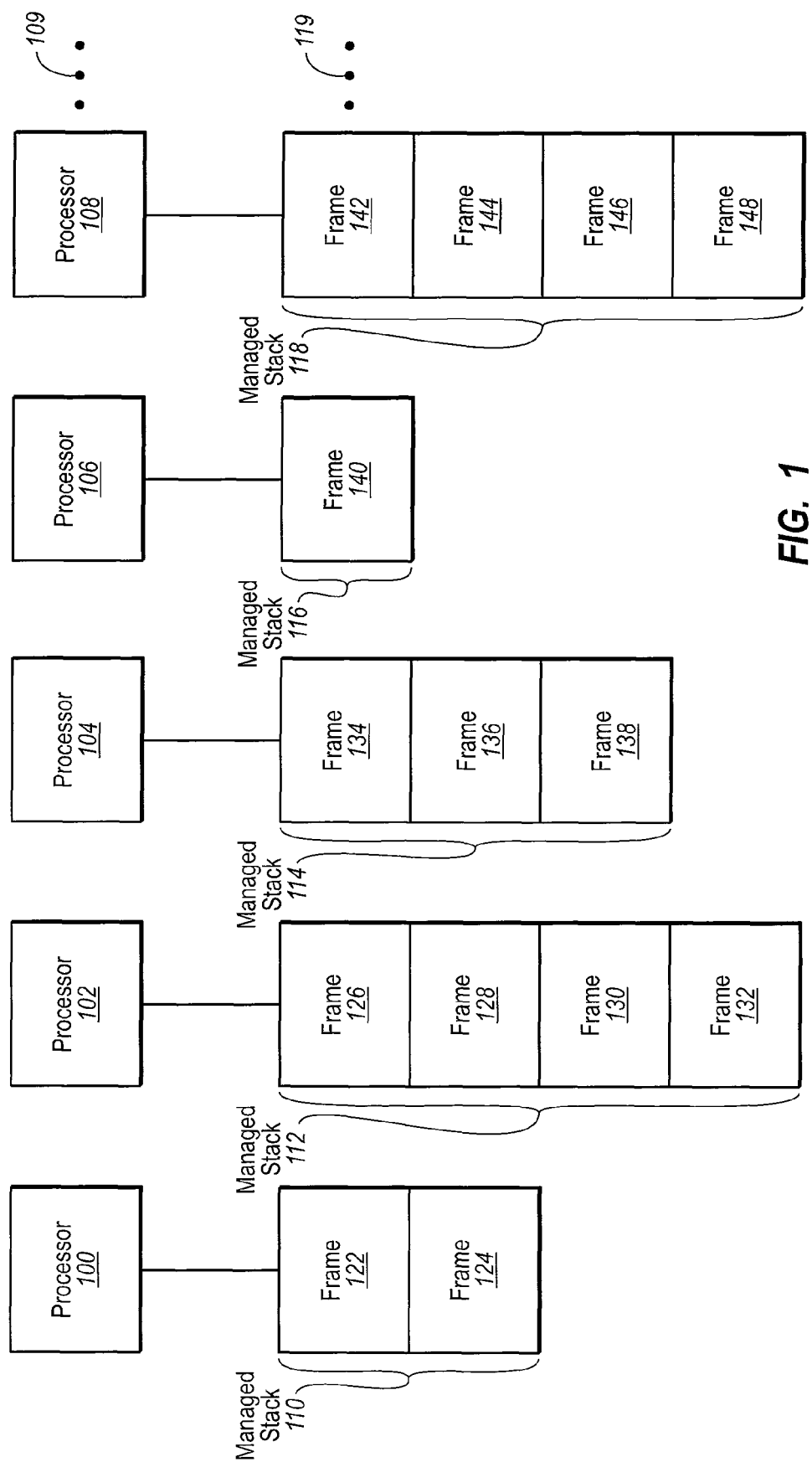
FIG. 1 illustrates a multiprocessing environment and the relation of managed stacks to the processors.

Embodiments described herein relate to the allocation of chores among multiple processors in a multiprocessor environment. In some cases, the embodiments may comprise a special purpose or general-purpose computer including various computer hardware and/or firmware and/or software, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

In this description and in the following claims, a "chore" is defined as a subtask of a program that could be performed in parallel with other subtasks of the program in order to achieve some larger computational task. As such, a chore is generally described as an opportunity for parallelism. Because the chore is an opportunity for parallelism and does not require that the opportunity be taken, the chore exists whether or not the chore is actually being executed in parallel. The present examples describe the chores primarily as being identified by the programmer at the time the program is written. However, one of ordinary skill in the art will come to understand, after having read this description that the principles described herein apply when a compiler or interpreter identifies the chores at the time the machine-level executable code is generated. In order to take advantage of the chore, one process may execute one chore, while another process executes another chore.

In one embodiment, the programmer identifies a computed action (i.e., a computation) in which, during the execution of the computation, a chore can be stolen. That is, a chore originally designated for a particular process may be taken for completion by yet another process. In this specific embodiment, which is by no means limiting of the inventive concept, the computation identified by the programmer is embedded within a try block of the program. The portion of code that is identified by the programmer as a chore associated with the identified computation is embedded within a catch block of the application, where the catch block is associated with that try block. One of ordinary skill in the art will recognize that the use of the terms "try" and "catch" are representative of the exception handling structure of the example embodiment and as such, are not limiting as to the invention itself. Other constructs designed specifically for chore management are applicable and within the scope of the disclosure.

In this description and in the following claims, a "worker" is defined as a computation agent that performs work for the computing system. One example of such a computation agent is a process managed by an operating system. In one embodiment, there is one worker per processor. However, in other embodiments, the number of workers does not equal the number of processors.

In this description, reference will be made to an exception table, an instruction pointer, and blocks of code. The exception table is defined as a compiler generated data structure that correlates blocks of code as being associated with either a try block or a catch block. In some embodiments, the terms "try" and "catch" are used in source code as "try statements" and associated "catch statements" to implement exception handling. However, the terms "try block" and "catch block" as used herein are meant to be more broadly interpreted. Specifically, a "try block" is defined to include any set of one or more instructions during which, if an exception is generated, results in a set of one or more instructions being, executed in the associated "catch block". Additionally, a catch block may have an associated filter wherein the catch block will catch only a particular type of exception within the associated try block. This definition holds regardless of whether the software language used is now existing or to be developed in the future.

The instruction pointer tracks the location of the currently executed code for a processor. A block of code is a particular section of the executable code generated by the compiler. The exception table contains references to the executable code and identifies particular blocks of code that are to be protected within a try block and code to execute within the associated catch block. For example, the exception table specifies that if an exception occurs while executing a particular try block, that an identified associated catch block will be executed.

In this description and the claims that follow, a managed stack is defined as a data structure that stores information about the active subroutines of a computer executable program for a process. In the case of a single process being associated with a single processor, therefore, each processor would have a managed stack. For simplicity, each managed stack will now be described as being associated with a particular processor, although the principles of the present invention are not limited to that implementation. The active subroutines are those that have been called by the program, but have not completed execution. The managed stack is used to keep track of the point to which each active subroutine should return control when it finishes executing. Each worker generally manages its own stack that the worker uses to track the execution of its particular subroutines. Within the managed stack are managed stack frames that refer to individual subroutines on the managed stack.

In this description and the claims that follow, stealing work is defined as a worker taking a chore from another worker's stack and executing the chore.

Referring now to FIG. 1, an example is shown of a multi-processor system and related managed stacks. Processors 100, 102, 104, 106, 108, and 109 each have an associated managed stack 110, 112, 114, 116, 118, and 119. Within each managed stack are stack frames that are associated with individual program subroutines. For instance, in the example of FIG. 1, managed stack 110 contains frames 122 and 124, managed stack 112 contains frames 126, 128, 130, and 132, managed stack 114 contains frames 134, 136 and 138, managed stack 116 contains frame 140, and managed stack 118 contains frames 142, 144, 146, and 148. Each frame within the managed stacks has an associated frame pointer that identifies the location of code an associated processor will return to when reaching that stack frame. The number of stack frames for a given managed stack is variable and is dependent upon the particular program and the number of subroutines currently being executed.

Figure 2:
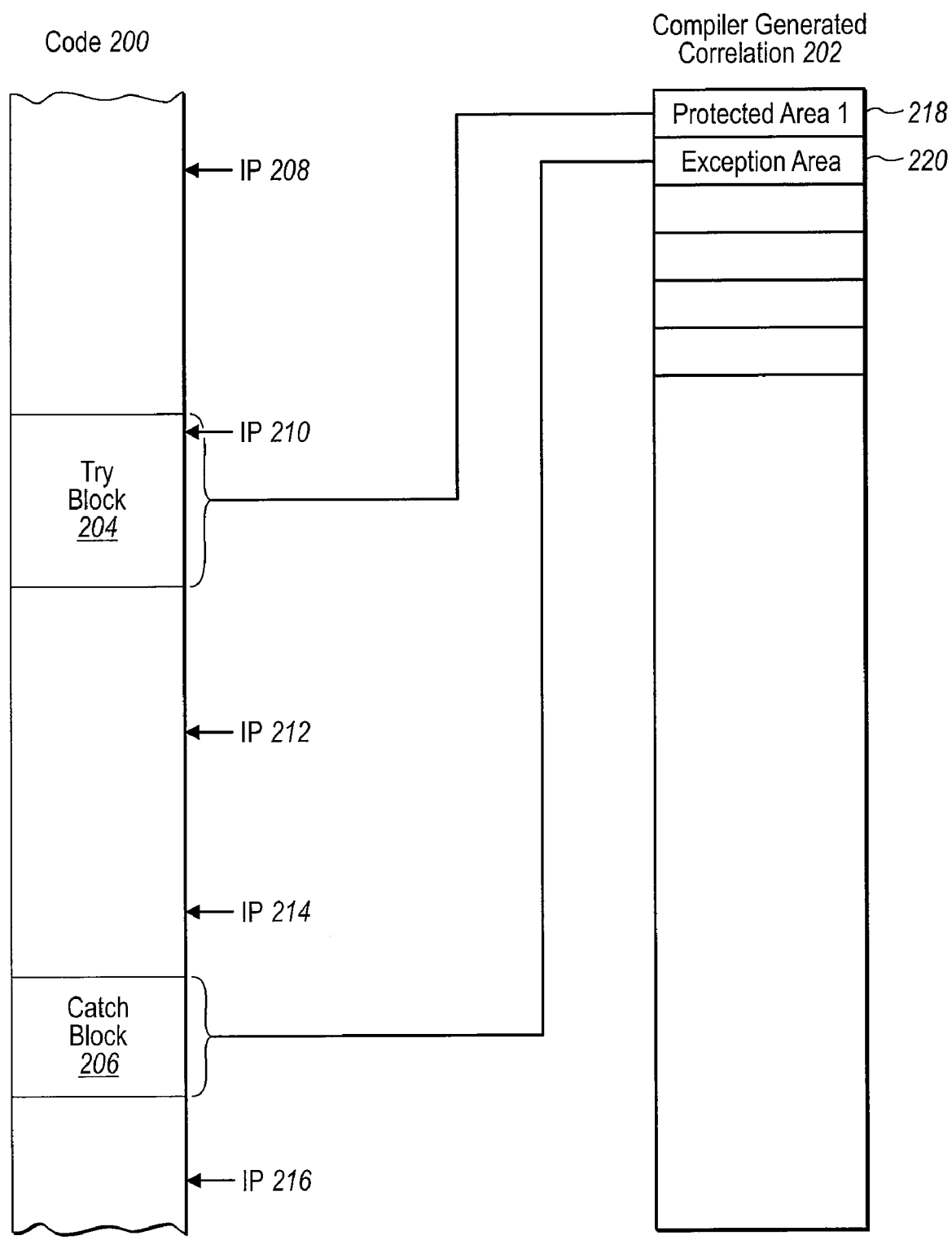
FIG. 2 illustrates an example of a compiler generated data correlation and its relation to the compiler generated executable code.

FIG. 2 illustrates the relationship between the executable code 200 and a compiler generated correlation in the form of an exception table 202. In this specific embodiment, the compiler-generated correlation comprises a compiler generated side table in the form of an exception table 202. The following description will utilize the example of exception table 202 for simplicity, but it is important to note that the exception table 202 could be any compiler generated data correlation. The exception table 202 is created at the time the executable code 200 is generated by a compiler or interpreter. Within the exception table 202 is an identification of at least two types of code. In keeping with the general description of an exception table, the types of code will be referring to common nomenclature with regard to an exception table and exception handling. However, the principles of the current invention are not limited to these specific examples. The first type of identified code is protected code, or code that is executed as part of a try block 204. The second section of code identified by the exception table is the exception code, or code that is executed as part of a catch block 206. In the example exception table shown, the protected area 218 corresponds to try block 204 of code, while the exception area 220 corresponds to a catch block 206 of code. In the examples given, the try block 204 of code is referred to as being protected by the "DoChore" exception, while the catch block 206 of code is referred to as the "DoChore" exception handler. The term DoChore is utilized to express simple example embodiments. However, the principles of the present invention are not limited to the nomenclature used to identify an exception type.

Additionally, FIG. 2 shows the use of instruction pointers 208, 210, 212, 214, and 216. Instruction pointers 208-216 are a reference describing the current location of code that is being executed by the instruction pointer's respective processor. As an example, instruction pointer 208 associated with processor 100 references the instruction being executed by processor 100, or alternatively references the instruction next in line to be executed. While the instruction pointer 208 is depicted with the code 200, the instruction pointer itself is only a reference and need not be physically associated with code 200. Typically the instruction pointer 208 references a memory address and resides within a register of processor 100.

While instruction pointer 208 is associated with processor 100, the other instructions pointers are associated with the current execution point for other processors. For instance, instruction pointer 210 may be associated with processor 106, instruction pointer 212 may be associated with processor 102, instruction pointer 214 may be associated with processor 104, and instruction pointer 216 may be associated with processor 108. Furthermore, each stack frame has an associated frame pointer (not shown).

As code 200 is executed, each worker proceeds to execute the portion of code 200 referenced by the worker's instruction pointer. Additionally, for each chore, an indicator indicates the status of the chore. Typically, each portion of code corresponds to an active subroutine that must eventually return control to portion of code that called the subroutine. The managed stack contains the address of the code that the worker should return to using the frame instruction pointers. When the end of the managed stack is reached, the worker has run out of work to do. In order to avoid the worker idling while there is potentially work that could be done; the worker begins the process of stealing a chore.

Figure 3:
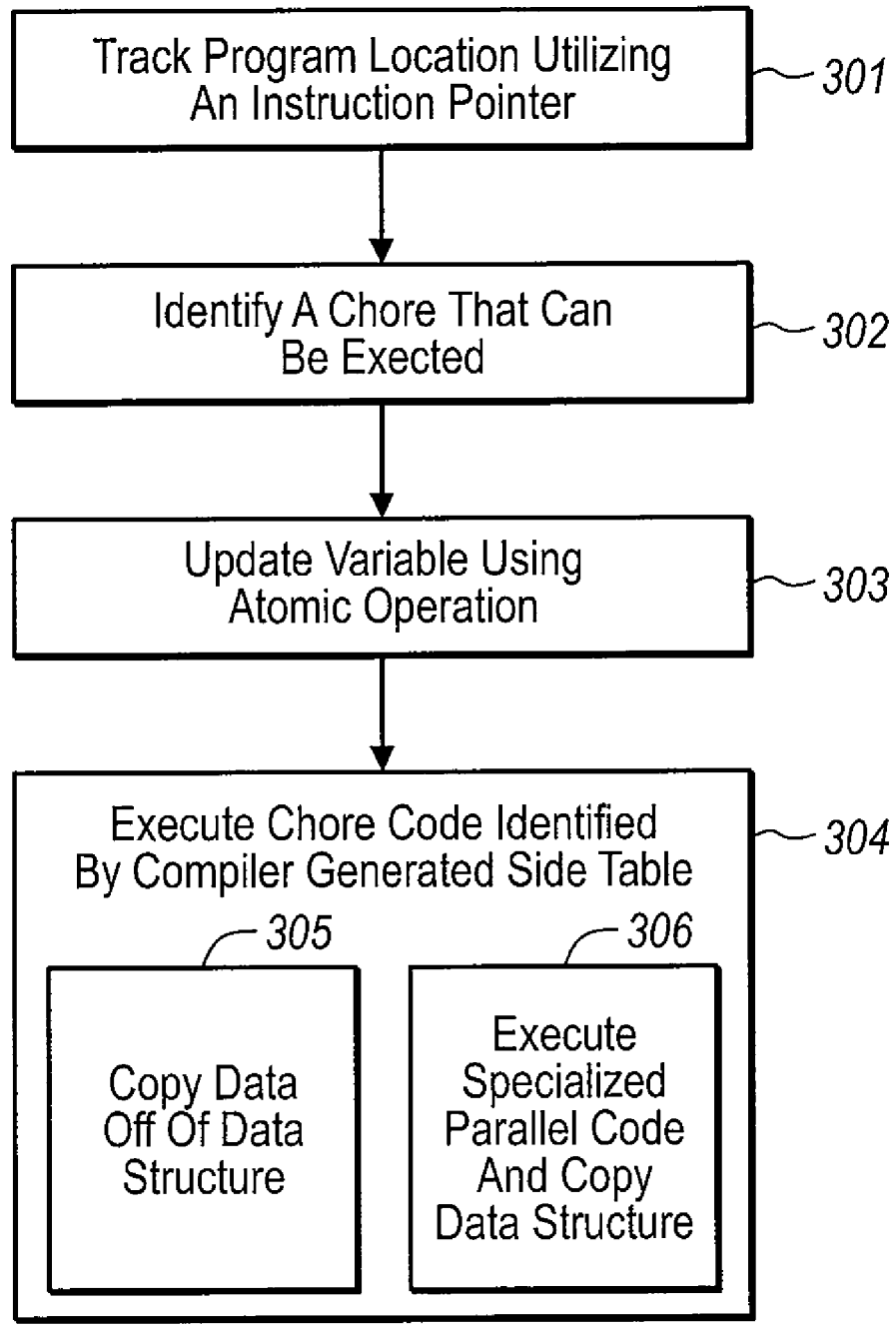
FIG. 3 illustrates a flow chart for the allocation of chores among a plurality of processors.

Referring to FIG. 3, the process 300 of stealing a chore begins after the worker recognizes a need to steal work. Examples of a worker recognizing a need to steal work include running out of items on the workers stack or reaching a point in the stack that directs the worker to code for stealing work. The worker that has recognized a need to steal work and now attempting to steal work will hereafter be called the "stealing" worker.

In act 301, the execution of the program is tracked using instruction pointers 208-216 related to each worker. The instruction pointer generally refers to the memory location of the currently executed instruction, the next instruction to be executed or could be any reference that identifies the instructions being executed. The instruction pointer is typically stored in a register of processors 100-109, but could be stored in any location accessible to processors 100-109 such as within the managed stack for a particular processor.

In act 302, the stealing worker identifies a chore that can be executed in parallel with the code that is currently being executed by a worker. The worker currently executing the code to be stolen will hereafter be referred to as the "original" worker. The stealing worker scans the managed stacks 110-119 combining techniques well known to those of ordinary skill in the art from garbage collection and exception handling. The stealing worker moves from managed stack frame 122-148 to managed stack frame 122-148 while accessing the exception table 202 to determine if the instruction pointer 208-216 or the frame instruction pointers for a particular original worker is within a block of code 200 identified by the exception table 202 as being protected from a "DoChore" exception. If the "DoChore" exception is currently executing, there is an associated block of code 200 identified by the exception table that executes a related chore that can be stolen.

As an example, in FIG. 1, processor 106 (the stealing worker) has run out of work to do as indicated by the single frame 140 on stack 116. The single frame 140 remaining on the stack 116 may refer to chore stealing code, or the processor 106 may default to chore stealing code once stack 116 is empty. The stealing worker associated with processor 106 will then begin scanning the managed stacks of processors 100, 102, 104, 108, and 109 in an attempt to find work to do.

Using techniques from garbage collection and exception handling, the stealing worker will use the exception table to look up areas of code 200 that are currently being executed by other workers. This may be done by referring to the instruction pointer for the other workers until an instruction pointer is found that resides in a protected area. In the example of FIG. 2, instruction pointer 210 is within a try block 204, which is identified in the exception table 202 as being a try a protected area 218. While only one protected block of code is shown in the code 200 for simplicity, it will be understood that the code 200 will typically contain multiple areas of protected code 218. Furthermore, it is possible that multiple instruction pointers will be found within the same protected area. For example, there may be two or more instruction pointers within the protected code 218. Once a protected block of code 218 is found, the exception table 202 is referenced to find a catch block 206 of code corresponding to the identified try block 204.

In act 303 a variable indicating the steal status of the identified chore is updated using an atomic operation. The variable is accessible to each of the workers so that any worker can update it in response to stealing the chore. By using an atomic operation, the worker can check whether the chore has been stolen and mark it as stolen in one operation. For example, if the atomic operation is a compare-and-swap, the stealing worker verifies that the variable is a known value and if the values match, updates the location of the variable with a new value in a single operation. This eliminates the possibility that a second worker could steal the chore before the stealing worker has an opportunity to update the variable indicating it has stolen the chore. If the variable indicates that the chore has already been stolen, the stealing worker proceeds to another managed stack to look for a different chore to steal.

Upon a successful update of the variable, act 304 is performed wherein the stealing worker executes exception code contained in the catch block 206 identified by exception table 202. In one embodiment using act 305, the exception code immediately copies data off the stack of the original worker and onto the stealing workers stack. In this way, when the original worker completes its current subroutine, it will return past the point where the chore was previously.

As an alternative, in act 306 the exception code identified by catch block 206 may contain distinct blocks of code specialized for the stealing worker and/or the original worker. If the catch block 206 contains a block of code specialized for the stealing worker, the data contained on the stack of the original worker is copied onto the stack of the stealing worker. In this case, the variable would then be updated to indicate that the process of stealing is complete. In this way, when the original worker completes its current subroutine, it will recognize that the chore has been stolen and will not attempt to execute the chore code.

Figure 4:
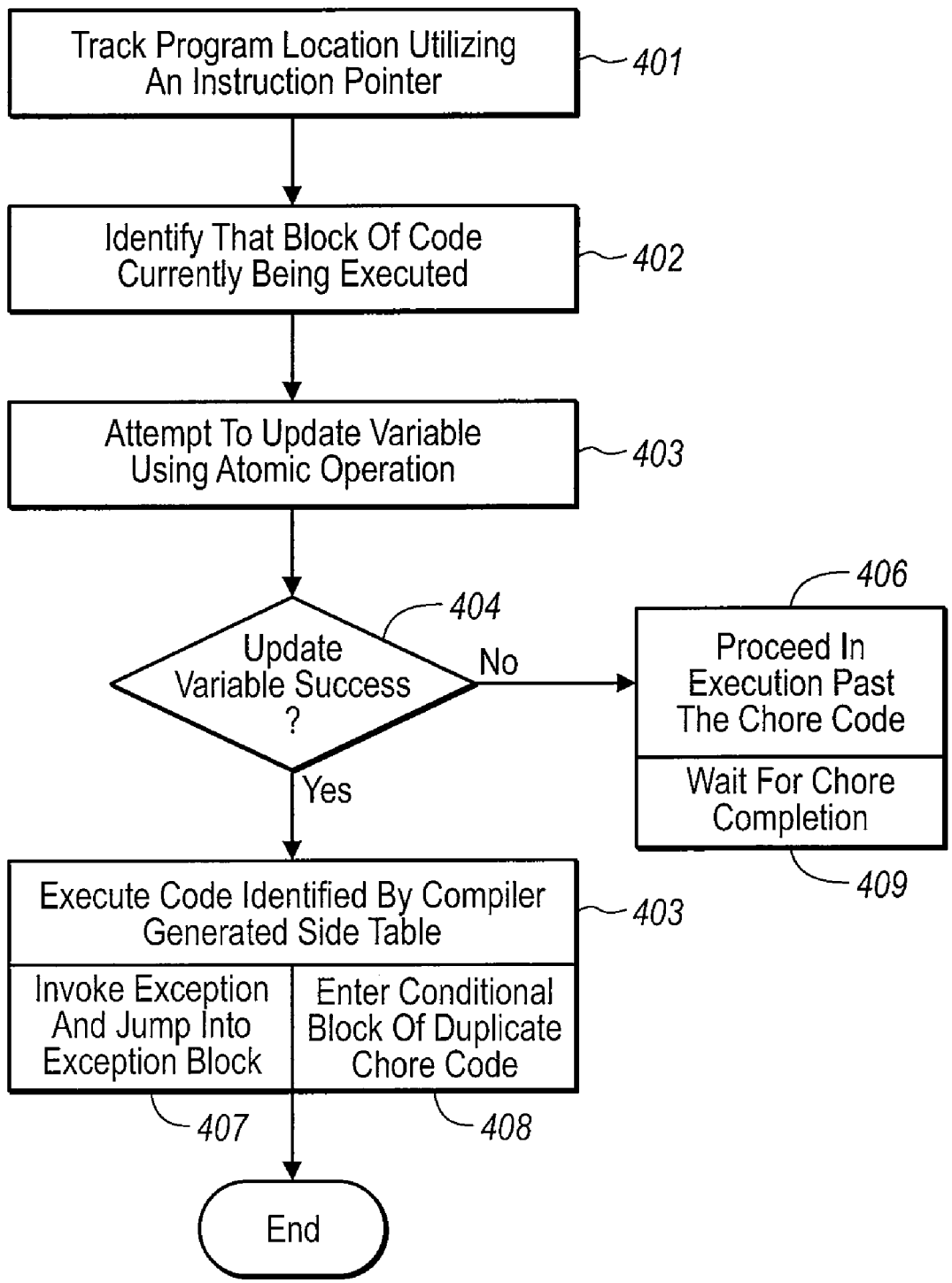
FIG. 4 illustrates a method for coordinating threads between processors during the execution of a program.

FIG. 4 illustrates a method 400 for coordinating threads between processors using chores. In act 401 the execution of the program is tracked using instruction pointers. There is generally one instruction pointer per worker so that each worker tracks where it is at in the code, and frame instruction pointers identifying where the worker will return to in the code upon completion of a stack frame. The instruction pointers may be a reference to a memory location of the code and are generally stored within a register contained in a processor or some other location that can be accessed at high speed.

In act 402, the block of code currently being executed by an original worker is identified as being associated with a chore. This may be accomplished by the code itself declaring that it has an associated chore, or can be identified using exception table 202.

When the block of code identified as being associated with a chore is completed by the original worker, act 403 is implemented. In act 403, an attempt to update a variable corresponding to the chore associated with the block of code is performed using an atomic operation. The variable indicates the status of the chore and indicates whether the chore has been stolen. The variable may additionally indicate that the process is in the process of being stolen. As an example, if the original worker attempts to update the variable using a compare and swap operation, the operation will return either a value that says the operation failed, indicating that the chore has been stolen, or the operation will return a success indicating that a successful update was performed.

If the atomic operation indicates that the chore has not been stolen (i.e., the compare and swap returned a success), then act 405 is performed as indicated by decision block 404 wherein the original worker executes the chore code identified by the compiler-generated correlation. In act 407 the original worker executes the chore code by raising a chore exception and jumping into the exception block of code identified by the exception table 202. As an alternative, in act 408 the chore code is duplicated outside of the catch block 206 and the original worker enters a conditional block of code containing the duplicate chore code. Other possibilities are possible for executing the associated chore code and these two examples are not meant to be inclusive of all possible acts for executing the chore code.

If the atomic operation indicates that the chore has been stolen, (i.e., the compare and swap operation returns an unsuccessful result) then the chore has been stolen and the original worker need not execute the chore code. As indicated by decision block 404, upon an unsuccessful update act 406 is performed wherein the original worker proceeds in execution past the chore code. If the code is implementing fork/join concurrency, then act 409 is performed wherein the original worker waits until the stolen chore is completed. If the code is not implementing fork/join concurrency, the original worker can perform act 406 immediately and proceed past the chore code and continue the execution of code or, if no code remains to be executed, the original worker could attempt to steal work from another worker.

In some instances, it may be necessary for the original worker to coordinate with the stealing worker to ensure the stack is not modified by the original worker while the stealing worker is using it. In act 410 this is accomplished by the original worker spinning until the stealing worker updates the variable indicating that the stealing process is complete. Alternatively, in act 411, the execution of code by the original worker is suspended by the stealing worker during the time the chore code is being stolen. Other methods of ensuring the stack is not modified by the original worker during the time that the chore is being stolen are possible and these two examples are in no way the only ways in which this could be done.

The described methods may be implemented using a high-level computer programming language that is then compiled into computer executable code that performs the described method. As an example, the following high-level pseudocode would implement features of the invention in the calculation of a Fibonacci number.

```
public static IntPromise Compute(int n)
{
    if (n <= 1) {
        return n;
    }
    FibChore chore;
    chore.arg = n-2;
    try {
        Chore.Queue(chore1.resolver);
        IntPromise f1 = Fib(n-1);
        return IntChore.Keep(ref chore.resolver)
            ? f1 + Fib(chore.arg)
            : f1 + chore.resolver.Promise;
        }
    }
    catch (DoChore ex) {
        int arg = chore.arg;
        IntResolver res;
        if (IntChore.Steal(&chore.resolver, out res)) {
            try {
                Fib(arg).when(res);
            }
            catch (Exception ex) {
                res.Break(res);
            }
        }
    }
}
```

The high-level code, or other code written by the programmer, may then be translated or compiled into computer-executable code. The computer-executable code may then be stored on a computer readable storage medium and later executed by a computing system.

Figure 5:
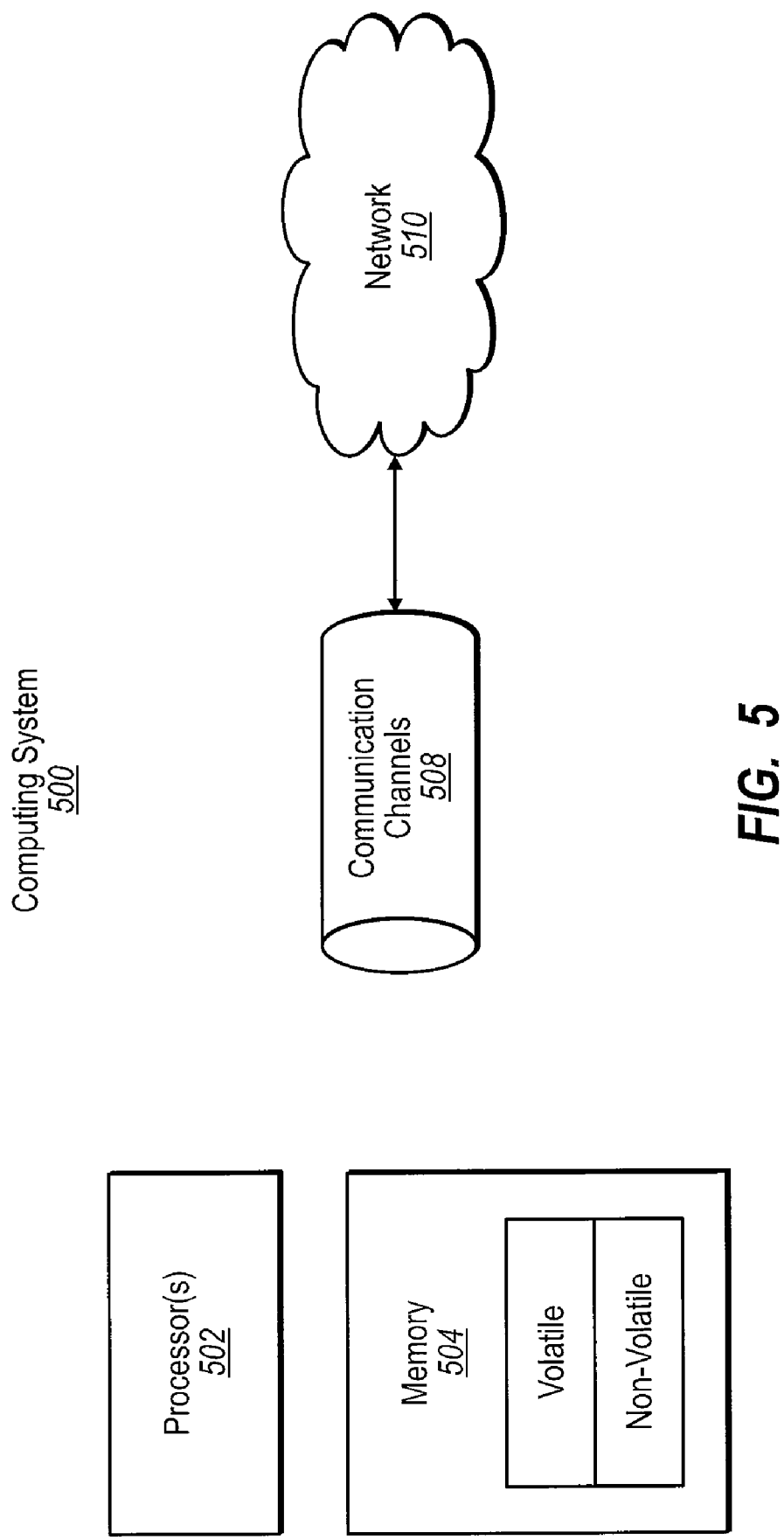
FIG. 5 illustrates a suitable operating environment for the principles of coordinating chores in a multiprocessor environment.

Referring to FIG. 5, in its most basic configuration, a computing system 500 typically includes a plurality of processing units 502 and memory 504. The memory 504 may be physical system memory, which may be volatile, non-volatile, or some combination of the two. The term "memory" may also be used herein to refer to non-volatile mass storage such as physical storage media. As used herein, the term "module" or "component" can refer to software objects or routines that execute on the computing system. The different components, modules, engines, and services described herein may be implemented as objects or processes that execute on the computing system (e.g., as separate threads).

Computing system 500 may also contain communication channels 508 that allow the computing system 500 to communicate with other computing systems over, for example, network 510. Communication channels 508 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable transmission medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing system including a plurality of processors, a method for managing the allocation of chores among the plurality of processors when executing a program, the method comprising:
   tracking the execution of the program utilizing instruction pointers that identify the locations of blocks of code currently being executed by a specific one of the processors of the computing system; and
   identifying a chore that can be executed in parallel with the blocks of code currently being executed by the processor utilizing an interpreter or compiler-generated correlation between the blocks of code currently being executed and a block of executable code that, when executed, performs the chore, the correlation comprising a compiler generated exception table.

2. The method of claim 1, wherein tracking the execution of the program references a managed stack associated with the specific one of the plurality of processors.

3. The method of claim 1, further comprising;
   attempting to update a variable utilizing an atomic operation, the variable indicating a status of the chore, and wherein the chore is in the process of being stolen; and status of the chore, and wherein the chore that is in the process of being stolen; and
   upon a successful update of the variable, executing chore code identified by the correlation.

4. The method of claim 3, wherein the atomic operation is a compare and swap operation.

5. The method of claim 3, wherein the chore code identified by the correlation comprises instructions for immediately copying data off of a data structure associated with the specific processor.

6. The method of claim 3, wherein the chore code identified by the interpreter or compiler-generated correlation comprises chore-specific code optimized for execution in parallel with the blocks of code currently being executed by the specific processor and that copies data from a data structure associated with the specific processor and further updates the variable to indicate that the process of the chore being stolen is complete.

7. In a computing system including a plurality of processors, a method for coordinating threads between the processors when executing a program, the method comprising:
   tracking the execution of the program utilizing instruction pointers that identify the locations of blocks of code currently being executed by one or more specific processors of the computing system;
   identifying that a block of code, which is currently being executed by the program and a particular one of the processors, is associated with a potentially available chore utilizing a compiler-generated exception table correlation between the block of code currently being executed and a block of executable code associated with the potentially available chore;
   upon completing the execution of the current block of code, attempting an update of a variable corresponding to the associated chore using an atomic operation, the variable containing information indicative of the status of the potentially available chore;
   upon a successful update of the variable, executing the block of executable code associated with the potentially available chore which is identified by the interpreter or compiler-generated correlation; and
   upon an unsuccessful update of the variable, proceeding in execution to a point past the block of executable code associated with the potentially available chore as identified in the compiler-generated exception table correlation.

8. The method of claim 7 wherein the atomic operation comprises a compare-and-swap operation.

9. The method of claim 7, wherein executing the block of executable code associated with the potentially available chore comprises invoking an operation raising an exception and jumping into an exception block of code identified by the correlation.

10. The method of claim 7, wherein executing the block of executable code associated with the potentially available chore comprises entering a conditional block of code contains a duplicate of chore code following the block of code currently being executed by the program.

11. The method of claim 7, wherein proceeding past the point in the block of executable code associated with the potentially available chore comprises waiting for an indication that the block of executable code associated with the potentially available chore has completed its execution.

12. The method of claim 7, wherein proceeding past the point in the block of executable code associated with the potentially available chore comprises spinning until the variable indicates that the block of executable code associated with the potentially available chore has been stolen.

13. The method of claim 7, wherein proceeding past the point in the block of executable code associated with the potentially available chore comprises suspending the execution of the block of code during a time that the block of executable code associated with the potentially available chore is in a process of being stolen.

14. The method of claim 7, wherein identifying that the block of code currently being executed by the program and the particular one of the processors is associated with a potentially available chore includes identifying that an instruction pointer of the particular one of the processors is pointing to the block of code and wherein the block of code is a try block of code, and wherein the block of executable code associated with the potentially available chore is a catch block of code.

15. A computer program product comprising one or more computer readable physical storage media storing computer executable instructions that, when executed by a processor, perform a method that includes:
   tracking the execution of the program utilizing instruction pointers that identify a location of a block of code currently being executed by a specific one of the processors of the computing system;
   a stealing worker identifying a potentially available chore associated with the program utilizing a compiler generated exception table that identifies a correlation between the block of code currently being executed and a block of executable code associated with the potentially available chore;
   the stealing worker attempting to update a variable utilizing an atomic operation, the variable containing information indicating a status of the potentially available chore that is in the process of being stolen; and
   upon an successful update of the variable, the stealing worker executing the block of executable code associated with the potentially available chore which is identified by the compiler generated exception table.

16. The computer program product of claim 15, wherein the method performed by the instructions further comprises:
   an original worker identifying that the block of code, which is currently being executed by the original worker, is associated with the potentially available chore utilizing the correlation between the block of code currently being executed and the block of executable code associated with the potentially available chore;
   upon the original worker completing execution of the block of code, the original worker attempting the update of the variable using an atomic operation; and
   upon the original worker unsuccessfully updating the variable, the original worker proceeding in execution to a point past the block of executable code associated with the potentially available chore.

17. The computer program product of claim 15, wherein the method performed by the instructions further comprises:
   the original worker waiting for the stealing worker to steal the potentially available chore.

18. The computer program product of claim 17, wherein the method performed by the instructions further comprises:
   the original worker spinning until the variable indicates that the stealing worker has stolen the chore.

19. The computer program product of claim 15, wherein the method performed by the instructions further comprises:
   the stealing worker suspending the execution of the original worker during a period of time that the stealing worker is stealing the chore.

* * * * *